No. 652,989. Patented July 3, 1900.
C. H. WHEELER.
RUBBER TIRE FOR VEHICLES.
(Application filed Apr. 24, 1899.)
(No Model.)
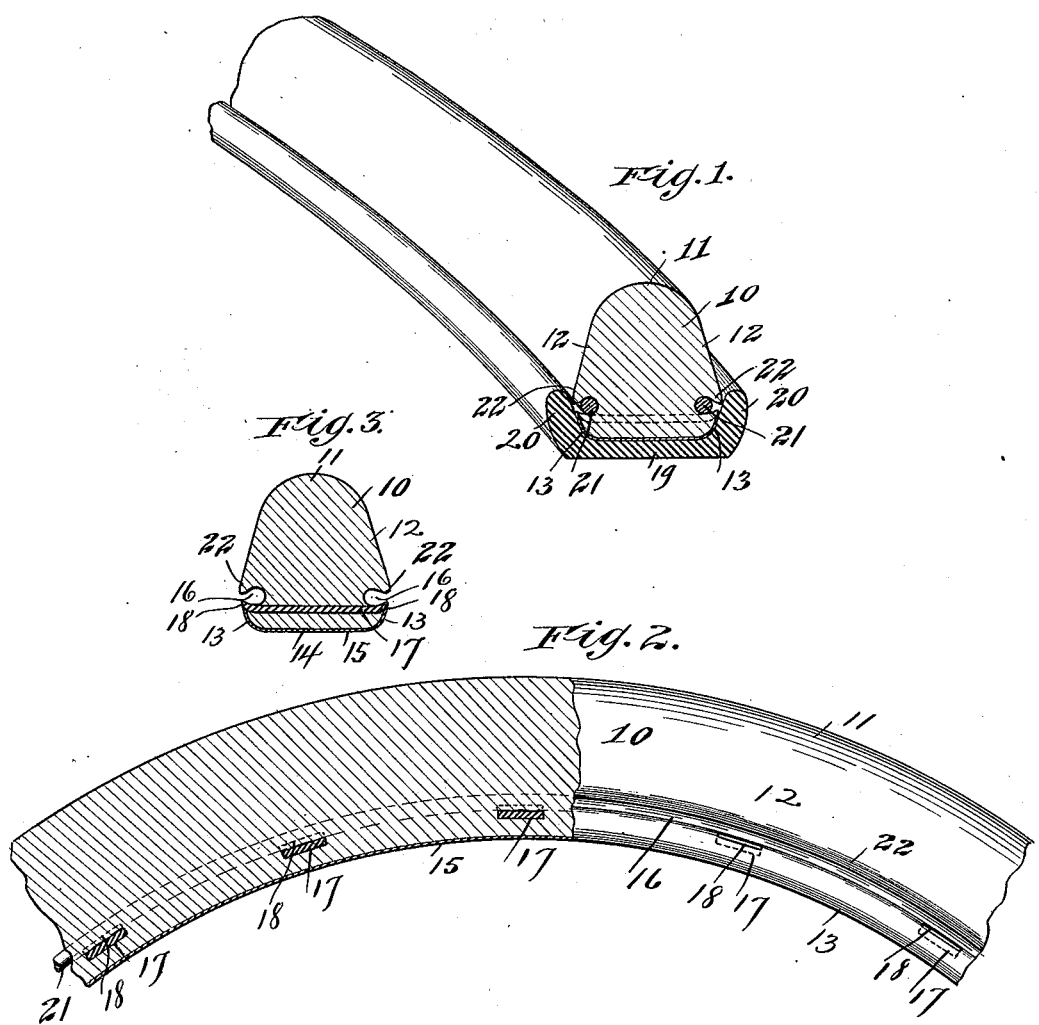
Witnesses,
Inventor,
Charles H. Wheeler,
By Offield, Towle & Linthicum
Attys.

UNITED STATES PATENT OFFICE.

CHARLES H. WHEELER, OF AKRON, OHIO.

RUBBER TIRE FOR VEHICLES.

SPECIFICATION forming part of Letters Patent No. 652,989, dated July 3, 1900.

Application filed April 24, 1899. Serial No. 714,248. (No model.)

*To all whom it may concern:*

Be it known that I, CHARLES H. WHEELER, of Akron, in the county of Summit and State of Ohio, have invented certain new and useful Improvements in Rubber Tires for Vehicles, of which the following is a specification.

This invention relates to rubber tires for vehicles, and has for its object to provide a simple and effective means for securing tires of this character within a channeled metallic rim.

To this end my invention consists in certain novel features, which I will now proceed to describe and will then particularly point out in the claims.

In the accompanying drawings, Figure 1 is a perspective view, partly in section, of a tire embodying my invention, the same being shown in place in a rim constructed for its reception. Fig. 2 is a view, partly in elevation and partly in central vertical section, of a portion of a tire embodying my invention; and Fig. 3 is a transverse sectional view of the tire removed from the rim and without its fastening devices.

In the said drawings, 10 indicates the tire proper, which is constructed of rubber and is preferably of the form shown, having a rounded outer portion, as indicated at 11, and diverging side portions 12 to a point within the flanges of the rim, whereupon the sides converge, as shown at 13, to a junction with the flat bottom portion 14, which forms the innermost part of the tire. This latter part, as well as the inwardly-converging portions 13, are preferably provided with a covering 15 of some suitable fabric, such as canvas. At a point on each side of the tire, located at or slightly inward from the junction of the sides 12 and 13, there is provided a groove or recess 16, preferably similarly contracted at its mouth, as shown, and of a size sufficient to receive and inclose a retaining-wire. Immediately inward from these grooves and extending transversely of the tire from side to side thereof are located at suitable intervals a plurality of retaining or anchoring pieces 17. These pieces are preferably flat and comparatively thin, as indicated in section in Fig. 2 of the drawings, and their ends extend to the surface of the rubber of the tire at each side thereof and are adapted to contact with the sides or flanges of the channeled rim. I also prefer to so construct these retaining or anchoring pieces that their ends are slightly turned upward or outward toward the periphery of the tire, as indicated at 18.

This tire is employed in conjunction with a metallic rim 19, which is provided with outwardly-diverging flanges 20, whereby a channel or groove is formed which provides a seat for the tire. The proportion of the parts is preferably such that the grooves or recesses 16 lie wholly below the outermost portions of the flanges 20 when the tire is in place. In order to retain the tire in position in this rim, I employ two retaining-wires 21. These wires are independent and continuous and are seated within the open grooves or channels 16, formed in the sides of the tire, and rest upon the outer portions of the retaining-pieces 17, being held in position laterally by the flanges 20 of the rim and also by the upturned ends 18 of the retaining-pieces when such upturned ends are employed. It will be observed that when the wires are in position the lower portions of the outer part of the tire extend downward to form ribs 22, which extend over the wires 21 and cover and protect the same, abutting against the flanges of the rim, so as to more effectually inclose and protect the channels or grooves and the wires located therein. The several elements of the tire may be assembled in any approved manner employed in the assembling of wired-on tires— that is to say, the ends of the wires may be joined in any suitable manner, and this may be done either before or after the placing of the tire in the rim.

When the several parts are assembled in the manner shown in Fig. 1 of the drawings, it is obvious that any force operating upon the tire to twist or tilt the same laterally and thus throw it out of the rim will be resisted by the bearing of the wires upon the retaining-pieces, and owing to the relative location and arrangement of the parts the tire will be firmly and effectually held in place. The ends of the retaining-pieces are, moreover, pressed against the flanges of the rim in such a manner as to effectually prevent creeping of the tire and consequent injury thereto.

It is obvious that the details of construction may be modified without departing from the principle of my invention. For instance, although I prefer to employ the flat retaining-pieces 17 shown, which give a broad or extended bearing upon the rubber, yet I do not limit myself to this particular form of the retaining-pieces, and while I deem it desirable to provide these retaining-pieces with upturned ends, yet this feature may under certain circumstances be dispensed with. I therefore do not wish to be understood as limiting myself to the precise details hereinbefore described, and shown in the drawings.

I claim—

1. The combination, with a channeled metallic rim, of a rubber tire fitting within said rim and provided at each side with a continuous open groove or channel, retaining-pieces extending transversely of the tire immediately inward from said grooves, and retaining-wires located in said grooves and bearing on the retaining-pieces, substantially as described.

2. The combination, with a metallic rim having outwardly-diverging flanges forming a channel, of a rubber tire having a correspondingly-shaped inner portion to fit said channel, an outer portion the sides of which are at an angle to the inner portion, and provided at each side along the lines of junction with a continuous open groove or channel, said grooves or channels lying within the outer peripheries of the flanges, retaining-pieces extending transversely of the tire immediately inward from said grooves, and retaining-wires located in said grooves and bearing on the retaining-pieces, substantially as described.

3. The combination, with a channeled metallic rim, of a rubber tire fitting within said rim and provided at each side with a continuous open groove or channel, flat retaining-pieces extending transversely of the tire immediately inward from said grooves and each having an extended bearing-surface, and retaining-wires located in said grooves and bearing on the retaining-pieces, substantially as described.

4. The combination, with a channeled metallic rim, of a rubber tire fitting within said rim and provided at each side with a continuous open groove or channel, retaining-pieces extending transversely of the tire immediately inward from said grooves and having outwardly-extending extremities, and retaining-wires located in said grooves and bearing on the retaining-pieces adjacent to their extremities, substantially as described.

5. The combination, with a metallic rim having outwardly-diverging flanges forming a channel, of a rubber tire having a correspondingly-shaped inner portion to fit said channel, and an outer portion the sides of which are at an angle to the inner portion, said tire being provided at each side with a continuous open groove or channel located within the outer periphery of the flanges of the rim and the outer portion of the tire extending inward in the form of ribs to cover and protect said grooves, retaining-pieces extending transversely of the tire immediately inward from said grooves, and retaining-wires located in said grooves and bearing on the retaining-pieces, substantially as described.

CHARLES H. WHEELER.

Witnesses:
RICHARD WARD,
JESSIE M. STEWART.